United States Patent [19]

Yasuo

[11] Patent Number: 5,014,909
[45] Date of Patent: May 14, 1991

[54] TELEVISION RECEIVER

[75] Inventor: Takashi Yasuo, Aichi, Japan

[73] Assignee: Inax Corporation, Tokoname, Japan

[21] Appl. No.: 493,833

[22] Filed: Mar. 9, 1990

[30] Foreign Application Priority Data

Mar. 16, 1989 [JP] Japan ............................... 1-30779[U]

[51] Int. Cl.⁵ .............................................. G05D 22/00
[52] U.S. Cl. .................................... 236/44 R; 62/158;
62/3.4; 361/383; 174/16.1
[58] Field of Search ................ 236/44 R, 44 A, 44 C,
236/44 E, 46 R, 49.1, 49.3, 1 F, 46 F; 62/176.1,
176.6, 3.4, 3.6, 158; 165/80.2, 80.3, 80.4;
313/13, 14, 12, 20; 174/11 R, 16.1; 336/55;
361/381, 382, 383, 384, 385

[56] References Cited

U.S. PATENT DOCUMENTS

| | | | |
|---|---|---|---|
| 2,187,011 | 1/1940 | Braden | 174/16.1 X |
| 2,897,487 | 7/1959 | Owen | 174/16.1 X |
| 3,547,348 | 12/1970 | Kruper | 236/44 |
| 4,586,342 | 5/1986 | Morishita et al. | 62/3.4 |

Primary Examiner—Harry B. Tanner
Attorney, Agent, or Firm—Kanesaka and Takeuchi

[57] ABSTRACT

In a television receiver which is installed in a high-humidity environment such as a bath room, a main body of a television receiver and a dehumidifier are placed in a container case provided with a waterproof structure, and a drain pipe is connected to the dehumidifier for discharging water generated in the dehumidification operation to the outside of the container case.

2 Claims, 3 Drawing Sheets

TELEVISION RECEIVER

Field of the Invention and related Art Statement

This invention relates to a television receiver having a construction suitable for installation in a high-humidity environment such as a bath room.

Recently, a demand is increasing for installing a television receiver in the bath room and enjoying music programs, movies and the like even during bathing.

In order to place a television receiver in an environment which is highly humid and subject to hot water or water, such as the bath room during bathing, it is conceived that it is contained in a case having a waterproof structure. However, a television receiver must release heat during operation, and in addition, due to the waterproof structure within the container case, there is little permeability. For this, the inside of the container case is heated up to a high temperature during the operation of the television receiver.

When the operation of the television receiver is stopped after a certain time, the temperature in the container case gradually decreases, but the relative humidity in the container case increases at the same time, finally causing condensation. The condensate could not only deposit on the faceplate to make the pictures difficult to see, but also produce performance deterioration of the electronic parts circuits and even cause a short circuit.

OBJECT AND SUMMARY OF THE INVENTION

It is, in view of the above described problem, an object of the invention to provide a television receiver which allows enjoying the television pictures safely and comfortably even in a high-humidity environment such as a bath room.

It is a further object of the invention to provide a television receiver, which causes no condensation within the container case and therefore the faceplate is always kept clear and the electronic parts and circuits of the receiver main body are always maintained to be a good condition, so that there is no fear of introducing a malfunction or short circuit trouble.

It is a still further object of the invention to make it possible to expand the areas where a television receiver can be set safely.

In the television reciever of this invention, the main body of the television receiver and a dehumidifier are placed in a container case provided with a waterproof structure, and a drain pipe is connected to the dehumidifier for draining water generated in the dehumidification operation to the outside of the container case.

By the above described arrangement, the television receiver according to this invention is adapted to condense water vapor from air within the container case in which the main body is to be placed, by means of a dehumidifier, and discharge it as water to the outside of the container case from the drain pipe connected to the dehumidifier. Accordingly, the inside of the container case is always kept at or lower than a fixed humidity. Therefore, even though the temperature within the container case falls after the operation of the television receiver is terminated, no condensation due to increase in the relative humidity occurs.

PREFERRED EMBODIMENTS

Figure 1:
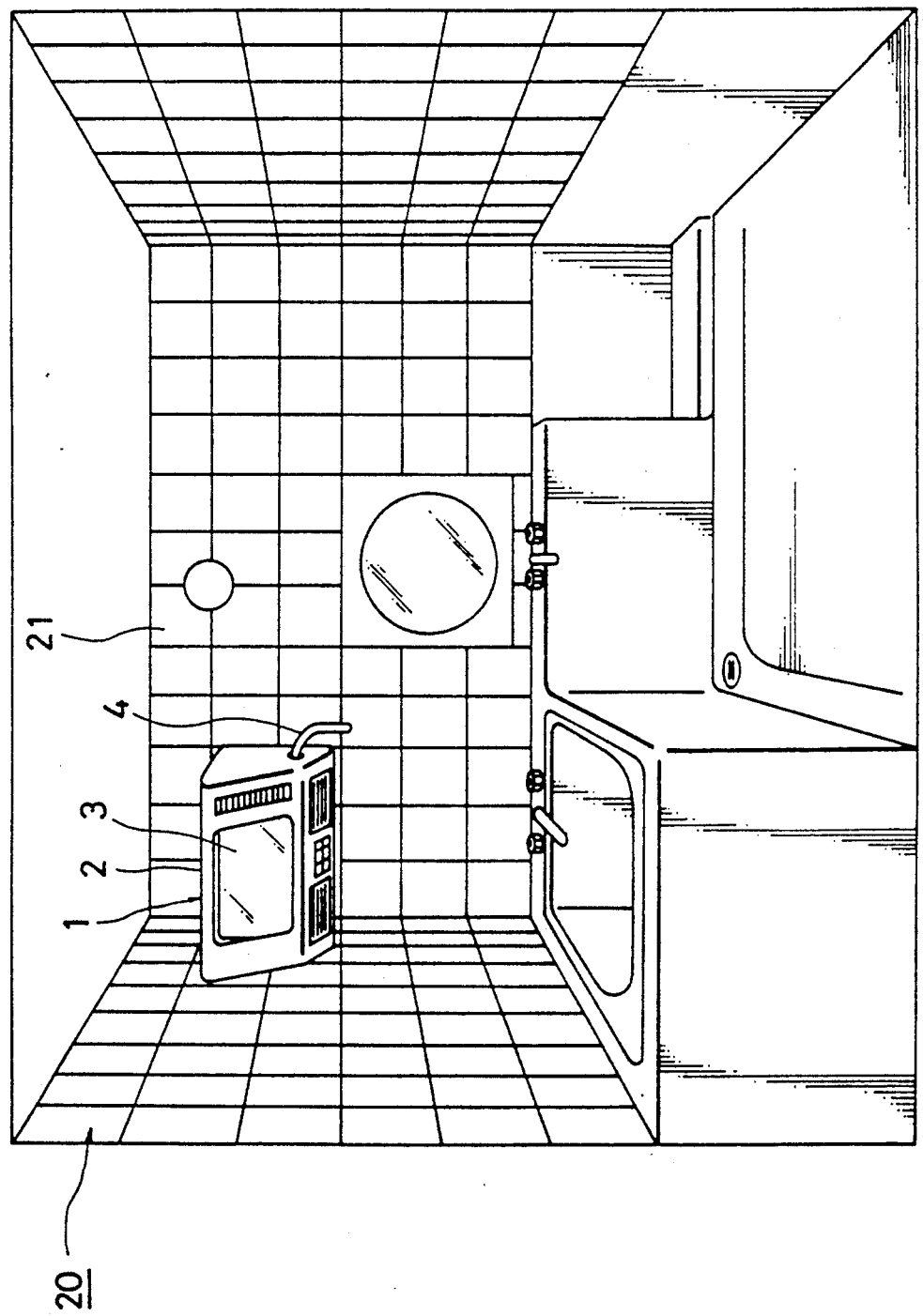
FIG. 1 is a perspective view showing the installation of the television receiver according to this invention in a bath room.

Now, the detail of this invention is described using the drawing which show the embodiments.

Figure 2:
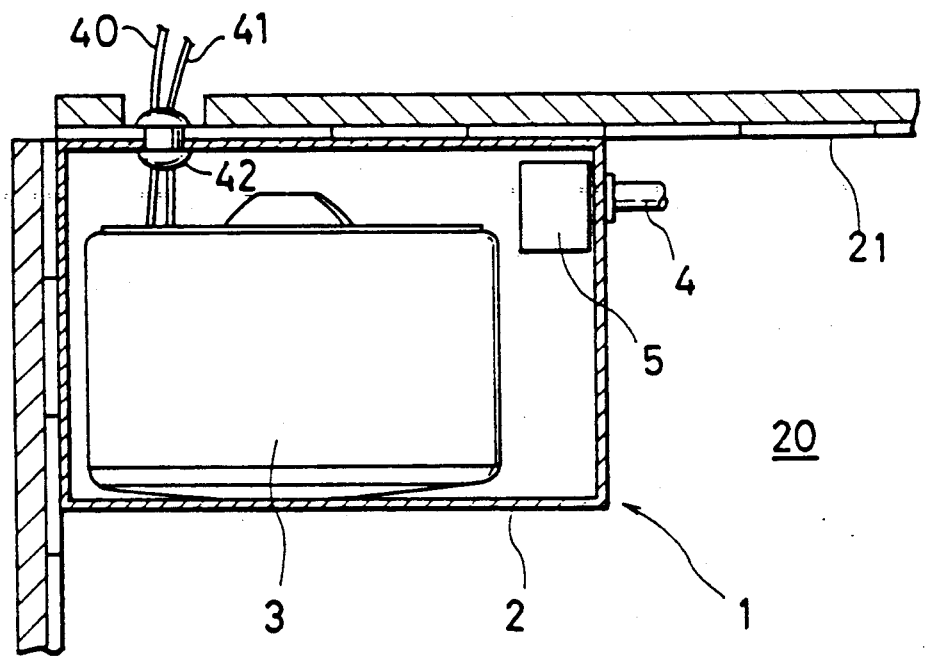
FIG. 2 is a sectional plan view of the television receiver.

FIG. 1 shows the state in which a television receiver 1 according to this invention has been installed in a bath room 20, and FIG. 2 illustrates the internal structure of the television receiver 1. As shown in FIG. 1, the container case 2 of the television receiver 1 is fixed on a bath room wall surface 21 at an appropriate height. And, as shown in FIG. 2, a television receiver main body 3 and a dehumidifier 5 are placed in the container case 2. A drain pipe 4 is connected to the dehumidifier 5 for discharging water generated by condensation of water vapor in air during the dehumidification operation to the outside of the container case 2. As the dehumidifier 5, for instance, the electronic cooling type utilizing the Peltier effect of a semiconductor can be employed. The electronic cooling type by a semiconductor has an advantage that the dehumidifier 5 can be made small and the power consumption is small. Of course, a dehumidifier of other type can be also utilized.

40 is an antenna line and 41 is a power line, and they are passing through the container case 2 and the bath room wall surface 21 through a grommet 42, respectively.

In the television receiver 1 as constructed above, even if a high-humidity air at the time of bathing flows into the container case 2, the absolute humidity within the container case 2 can be reduced by condensing water vapor with the dehumidifier 5 and discharging it to the exterior. Therefore, even though the inside of the container case 2 has cooled after terminating the operation of the television receiver main body 3, condensation is positively blocked.

Figure 4:
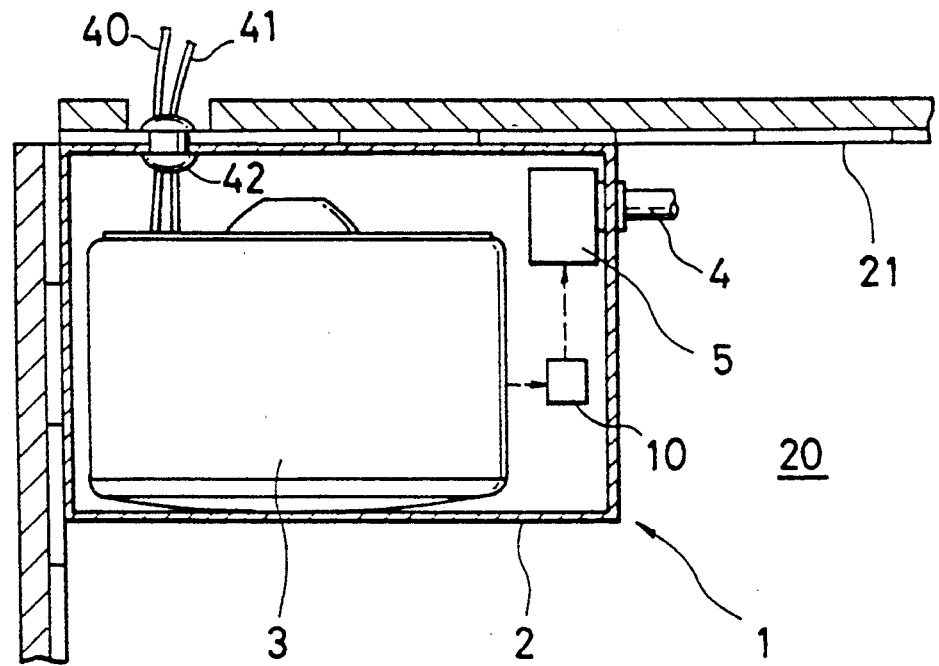
FIG. 4 is a circuit block diagram.

In this invention, the start-up and stop of the dehumidifier 5 can also be interlocked with the operation of the receiver main body 3. Particularly, in order to prevent condensation when the inside of the container case 2 cools, the dehumidifier 5 can be timer controlled so that the dehumidification operation continues for a predetermined time even after the stopping of the operation of the receiver main body 3, as shown in FIG. 4. In FIG. 4, a control unit 10 provides a dehumidification operation start signal to the dehumidifier 5 when the operation initiation signal of the receiver main body 3 is input. The control unit includes a timer, and the time count of the timer is started when the operation termination signal of the receiver main body 3 is input. And, when a predetermined time is counted, a dehumidification termination signal is provided from the control unit 10 to the dehumidifier 5.

Figure 5:
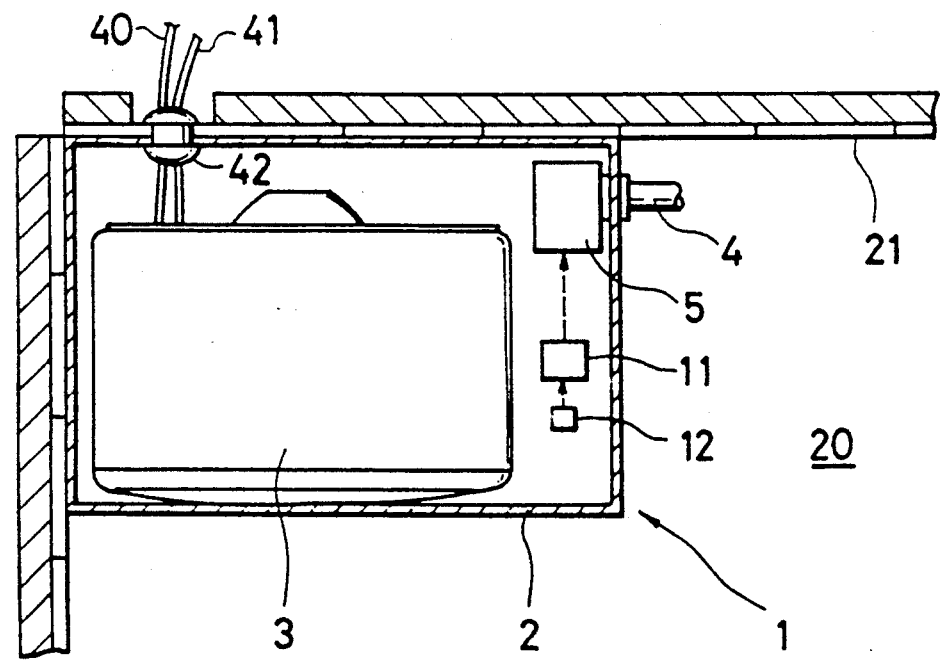
FIG. 5 is another circuit block diagram.

Also, in this invention, condensation may occur depending on change in the temperature, so in order to prevent this, it may be allowed that a humidity increase within the container case 2 is sensed to cause the dehumidifier 5 to operate automatically, as shown in FIG. 5.

A control unit 11 in FIG. 5 is connected so that a humidity signal is input to a humidity sensor 12. When the sensed value of the humidity sensor 12 exceeds a predetermined value, the control unit 11 provides a dehumidification operation start signal to the dehumidifier 5. When the sensed value of the humidity sensor 12 becomes the predetermined value or lower, the control unit 11 provides a dehumidification operation stop signal to the dehumidifier 5.

Figure 3:
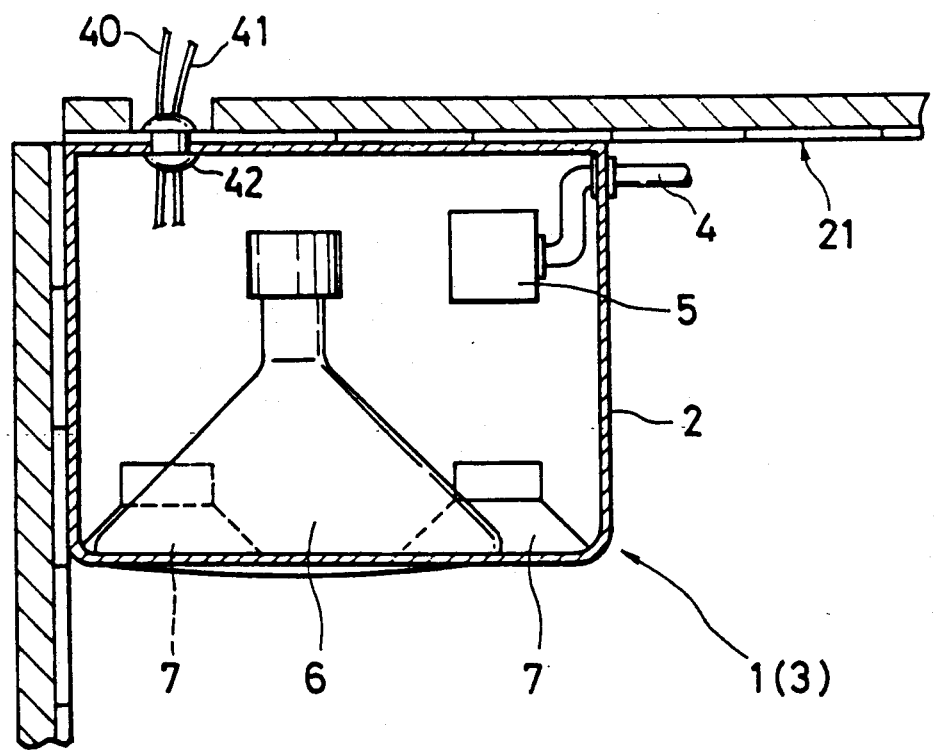
FIG. 3 is a sectional plan view of the television receiver according to another embodiment.

In this invention, as shown in FIG. 3, in the television receiver 1 in which the case itself of the receiver main body 3 for receiving an image receiving tube 6, speakers 7 and other electronic parts (omitted from the figure) are provided with a waterproof structure, the dehumidifier 5 may be placed within the container case 2 of the receiver main body 3. The television receiver according to this invention is effective not only when it is installed in a bath room, but also in other high-humidity environment.

Thus, this invention can be modified in a variety of ways depending on the aspects of the television receiver.

What is claimed is:

1. A television receiver to be installed in a high-humidity environment comprising:
    a waterproof container case constructed so as to prevent penetration of water into an inside thereof;
    a television receiver main body placed in said container case so that a faceplate can be viewed from outside,
    a dehumidifier placed in said container case for removing moisture within the container case,
    drain path means provided so as to conduct water of said dehumidifier to the outside of the container case, one end of said drain path means being connected to the dehumidifier, and the other end of said drain path means being placed externally of the container case, and
    control means for operating said dehumidifier when said television main body is operated, said control means, when the operation of the television receiver main body is stopped, stopping the dehumidifier after elapse of predetermined time thereafter.

2. A television receiver as set forth in claim 1, further comprising means for sensing humidity in said container case, and control means for operating said dehumidifier when sensed value of the humidity sensor means exceeds a predetermined value.

* * * * *